United States Patent [19]

Failes

[11] Patent Number: 4,861,127

[45] Date of Patent: Aug. 29, 1989

[54] OPTICAL COUPLER

[75] Inventor: Michael Failes, Moffat, Canada

[73] Assignee: Canadian Instrumentation & Research Ltd., Burlington, Canada

[21] Appl. No.: 191,399

[22] Filed: May 9, 1988

[51] Int. Cl.⁴ .............................................. G02B 6/26
[52] U.S. Cl. ............................... 350/96.15; 350/96.21
[58] Field of Search ................ 350/96.15, 96.21, 96.29

[56] References Cited

U.S. PATENT DOCUMENTS

| | | | |
|---|---|---|---|
| 4,564,262 | 1/1986 | Shaw | 350/96.15 |
| 4,589,725 | 5/1986 | Dyott | 350/96.15 |
| 4,681,399 | 7/1987 | Hicks, Jr. | 350/96.15 X |
| 4,688,882 | 8/1987 | Failes | 350/96.15 |

*Primary Examiner*—Frank Gonzalez
*Assistant Examiner*—Phan T. Heartney
*Attorney, Agent, or Firm*—Riches, McKenzie & Herbert

[57] ABSTRACT

An improved optical coupler having improved performance at room temperature and a greater thermal operating range. The coupler comprises two optically contacted optical fibers in a substrate wherein the externally induced stress on the fibers in the region of optical contact, is reduced. The reduction occurs as a result of shape and material selection of the substrate. A process for making the coupler is also disclosed.

14 Claims, 2 Drawing Sheets

U.S. Patent  Aug. 29, 1989  Sheet 1 of 2  4,861,127
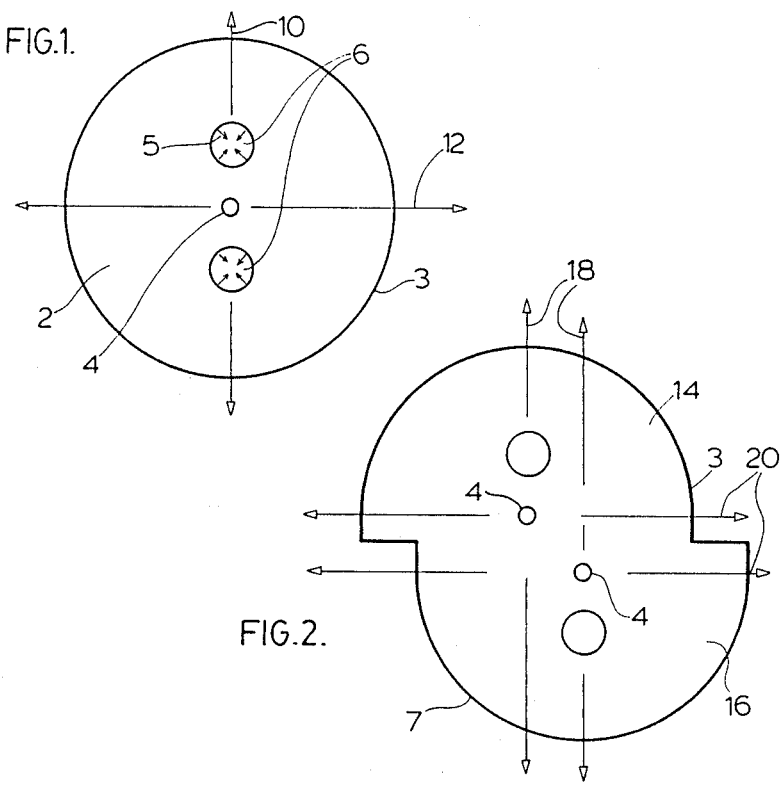
FIG.1.
FIG.2.
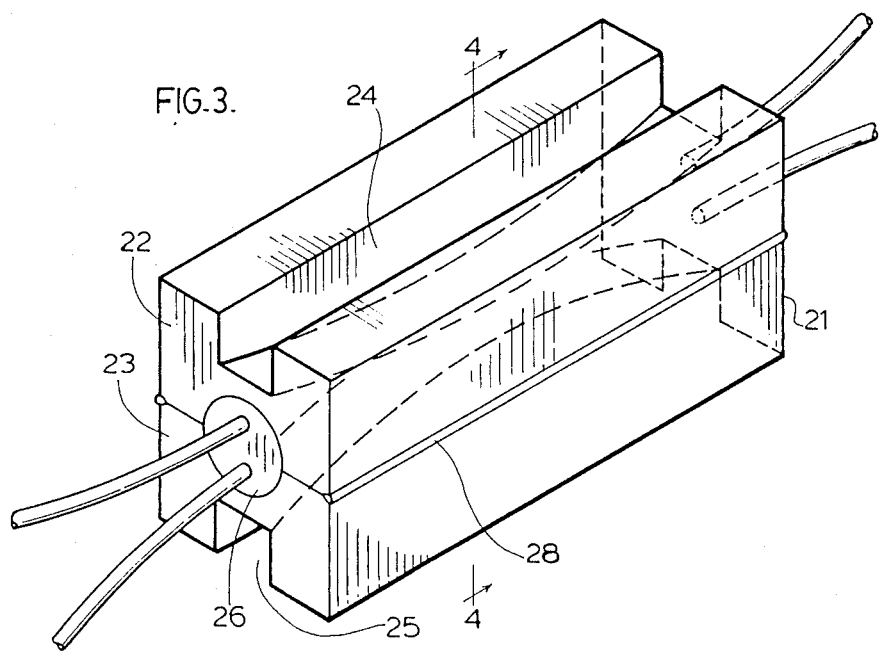
FIG.3.

OPTICAL COUPLER

RELATED APPLICATIONS

This application is related to my U.S. patent application Ser. No. 700,281 filed on Feb. 11, 1985 (now U.S. Pat. No. 4,688,882 issued Aug. 25, 1987) and Ser. No. 898,100 filed on Aug. 20, 1986 (now U.S. Pat. No. 4,707,201 issued on Nov. 17, 1987), the disclosures of which are herein incorporated by reference.

BACKGROUND OF THE INVENTION

1. Field Of The Invention

This invention relates generally to an optical coupler and more specifically, to an improved optical coupler having improved performance at room temperature and a greater thermal operating range, and a process for making same.

2. Description Of The Prior Art

Optical couplers are well known and various methods have been proposed to produce and assemble such couplers.

Polarization maintaining couplers are a special case of single mode couplers and are generally made from polarization preserving or single polarization optical fibers.

Single mode fibers that are polarization sensitive are predominantly of two forms, one, a fiber that has a generally elliptical shaped core within a cladding such that a prefered axis for transmission is created and a second, that has a stress member or stress members included in the structure having different expansion coefficients to the cladding such that a stress is created with a distribution that causes birefringence such that fast and slow axes are created and the fiber becomes polarization preserving or polarization maintaining.

The latter birefringent fiber is predominant and the following disclosure refers to this type but is not limited to it as all fibers are affected by mechanical and thermal stress which cause birefringence and thus affect the polarization sensitivity of the fiber.

In order to make useful polarization preserving couplers, it is necessary to control the manufacturing and assembly processes that make the coupler halves and the optically contacted assembled coupler, with particular attention to stress that is initially present in the fiber or that may be introduced by the processes. Design must also consider factors that may influence stress.

The fiber is embedded in the substrate after careful orientation of the stress members such that they are symetrically placed with respect to the plane of the polished surface. Removal of cladding and stress member material changes the amplitude of the internal stress in the remaining fiber but does not alter the direction of the stress and similarly birefringent axes which are usually parallel and perpendicular to the polished surface. The foregoing is predicated on the fiber itself being symetrical and fiber quality control for this attribute is important for coupler yield in the manufacturing process.

Coupler halves, when assembled will have their birefringent axes parallel and coupling will be from fast to fast axis and from slow to slow axis without cross coupling of fast to slow axes. As the coupler has the polished fibers from two halves in optical contact and some external pressure on the substrate is required to make contact there is an external force acting on the fiber which adds to the existing internally generated stress due to the fiber structure. If the external stress is in the same direction as the internal stress, then polarization attributes are maintained. If the external stress is not in the same direction, then polarization preservation is degraded due to cross coupling. Securing the halves tends to maintain or increase the external stress.

Within the scope of the definition of "securing the substrates" in my U.S. Pat. No. 4,688,882, it is an advantage to eliminate the predominant method of securing with an epoxy resin and secure the substrates by fusing the glass at the edge without disturbing the fiber. This results in a coupler having one less component to consider for expansion coeeficient and increases the magnitude of thermal and mechanical shock tolerance. Implementation of fusing requires that the substrate material has a high tolerance to local heating and resulting large thermal gradient which is usually associated with a very low expansion coefficient. In the prior art, in one embodiment, a substrate may be designed where a skirted edge is presented for fusion. The lower mass of this edge and the low conductivity of the skirt to the general mass of the substrate allow a greater thermal gradient than a square edge.

Fusing can be implemented by local heating with infrared radiation from a filament placed in close proximity to the edge or by 10.6 micron $CO_2$ laser radiation but in this case, the typical strong absorbtion in a thin surface layer must be modified by beam shape and intensity control. The electric arc and micro oxyhydrogen flames, as are common in fiber fusing apparatus, can also be used A very low expansion coefficient substrate is in conflict with an advantage herein after described which shows benefit from a substrate that has an expansion coefficient that matches the effective coefficient of the fiber in the direction perpendicular to the optical contact surface. This conflict can be partially overcome by the design of a substrate shape that allows a large tolerance to different expansion coefficients as will be hereinafter disclosed.

SUMMARY OF THE INVENTION

Accordingly, it is an object of the present invention to provide an improved optical contact coupler and a process of making same, wherein the externally induced stress on the fiber in the optical contact region is reduced by use of a shaped substrate and is also made less variable to change in temperature.

It is a further object of the present invention to provide an improved optical contact coupler and a process for making same, wherein the substrate is a material having a thermal expansion coefficient over a large temperature range which is as near as possible the mean of the optically contacted fiber assembly in the centre of the coupler.

Another object of the present invention is to provide an improved optical contact coupler made from single mode low birefringence fiber having a low sensitivity to polarization and a process for making same.

To this end, in one of its aspects, the invention provides an improved optical contact coupler which comprises two optically contacted optical fibers in a substrate, wherein the externally induced stress on the fibers in the region of optical contact is reduced.

In another of its aspects, the invention provides an improved optical contact coupler which comprises a shaped substrate, and a pair of optically contacted optical fibers, each fiber consisting of a cladding and a core, the substrate shaped to flex and absorb stresses caused by the differences in the expansion coefficients of the substrate and the optical fibers.

Further objects and advantages of the invention will appear from the following description taken together with the accompanying drawings.

BRIEF DESCRIPTION OF THE DRAWINGS

FIG. 1 is a sectional view of a stress induced birefringent polarization maintaining optical fiber.

FIG. 2 is a sectional view of a pair of optical fibers in optical contact.

FIG. 3 is a perspective view of a coupler of the present invention.

DESCRIPTION OF THE PREFERRED EMBODIMENT

Figure 4:
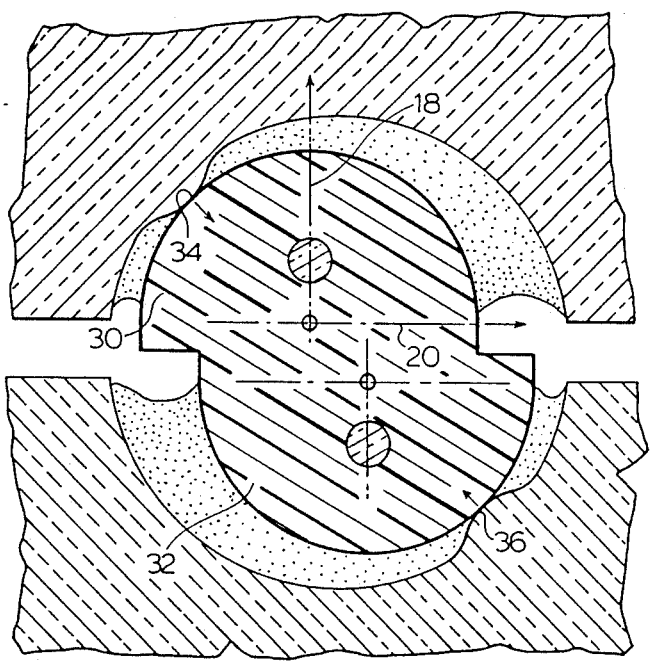
FIG. 4 is a sectional view along line IV—IV of FIG. 3.

The optical coupler of the present invention which has an improved performance at room temperature and over a greater thermal operating range, is made by optically contacting the flat, polished surfaces of two fibers which are supported in substrates. These substrates have a particular shape and are made from a particular material which reduce the effects of stress due to mechanical and thermal causes as well as having the properties for optical working as disclosed in my U.S. patent application No. 898,100 (now U.S. Pat. No. 4,707,201).

Polarization preserving optical fiber is composed of a cladding and a core, with appropriate doping to give the refractive index difference necessary to give optical guidance and stress members which are doped to give a coefficient of expansion different from the cladding to produce an internal stress. The stress gives the birefringence for polarization preservation.

The substrates are made from materials which are softer than the fiber cladding and allow for grinding and polishing of the coupler halves such that the polished fibers are positioned above the substrate surface by a small amount to allow ease of optical contact.

It is clear that the range of thermal stability is affected by the coefficients of expansion of the materials and the structure of the coupler. The most important aspect of the invention is the shape of the substrate as this can be designed to give flexibility in the coupling region which allows a range of substrate materials to be chosen that have different expansion coefficients from the fiber. Matching coefficients is advantageous in further extending the thermal operating range.

Referring now to FIG. 1, a polarization preserving fiber 3 is shown with cladding 2, and core 4. The stress members 6 are positioned diametrically opposite the core and shrink on cooling to an extent greater than the cladding resulting in the radial tension shown by the arrows 5. The net effect is to produce a resultant stress in the neighbourhood of the core in the direction of the axis 10 which is different from the stress in an orthogonal axis 12. The axes of stress induce corresponding axes of birefringence.

FIG. 2, shows two fibers 3, 7 that are optically contacted, having their axes 18 and 20 parallel such that polarization preservation is maintained in the coupling of light from one fiber to the other and cross coupling is prohibited.

FIG. 3 shows a perspective view of a coupler 21 that is made of two shaped substrates 22, 23, with a deep and wide slot 24, 25, in the back of each half. The depth of each slot 24, 25 increases towards the middle of the coupler 21 to produce and area having a reduced thickness and a weak structure in that region, which is the region of optical coupling, and the depth of each slot 24, 25 decreases to the ends of the coupler 21 to allow material thickness for the slots 26, which support the fiber and plastic jacket protective layer. The substrates 22, 23 are secured along the edge by a thin layer of epoxy resin 28, in the small gap resulting from the height differential of the fiber and the substrate and any small convexity of the substrate surface. The assembly of FIG. 3 is under a small stress introduced by slight bending of the substrates, due to contact pressure, in an assembly fixture which supports each coupler half and allows positioning for the desired coupling ratio. Shrinkage of the epoxy resin during the curing process also introduces further stress.

FIG. 4 is an exaggerated illustration of the micro shape of the groove supporting the fiber as a factor in the distribution of this external stress as shown in FIG. 3. The fibers 30 and 32, which are embedded in an epoxy, contact the groove at points 34, and 36. The contact points are offset from the birefringent optical axis of each fiber 30, 32 and the reaction at the surface is not parallel to the optical axes 18, and 20. The resultant external or assembly stress is not therefore aligned with the internal stress within the fiber and cross coupling occurs due to distortion of the fiber stress distribution. It is desirable to eliminate all mechanical shape factors which give external stress of this general effect as well as reduction in those stresses. The "V" block used in many mechanical locating fixtures is an alternative shape to the generally curved shape shown but can also suffer from decentering in production.

Thus, the use of such shaped substrate effectively reduces the effects of stress on the fiber in the optical coupling region. By specifically providing a shape which allows for a weak structure surrounding the fibers in the optical coupling region, the effect of the stress is marketedly reduced.

Figure 5:
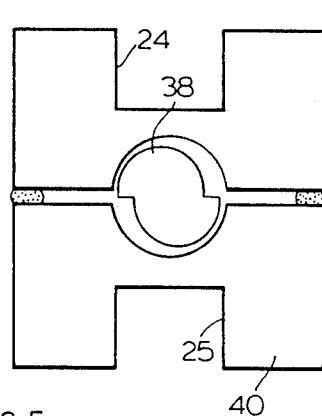
FIG. 5 is a sectional view of the middle of the coupler of FIG. 3, in the direction of the fiber.
Figure 6:
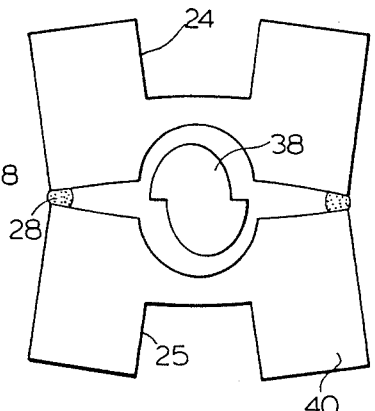
FIG. 6 at an elevated temperature, wherein the expansion of the optical fiber is greater than the expansion of the substrate.

Thermal changes may be considered with reference to FIG. 5 and FIG. 6. FIG. 5 shows the section of the coupler 31 at assembly temperature with no apparent distortion. FIG. 6 shows an exagerated view of the same section at elevated temperature where the fiber 38 has an overall coefficient of expansion greater than the substrate 40. The weak section created by the large rear slot 24, allows the substrates to flex in the weakened region and the forces acting on the fibers are drastically reduced resulting in much lower external stress. The range of operating temperature is therefore increased as well as making an improved device at room temperature.

The substrates are made from materials that have coefficients of expansion as near as possible to the fiber, in the direction perpendicular to the optical contact surface, as well as the properties needed for optical working. A good compromise for cost, hardness and expansion coefficient is Pyrex (trade mark) glass having a coefficient at $35 \times 10^{-6}$. Silica for reference is $0.6 \times 10^{-6}$. Other glass types such as lime alumina silicate glasses have been used with coefficients in the $20 \times 10^{-6}$ range but there are very few materials available at this time from which to select matching expansion coefficients. Most fiber is made with a silica cladding with variously doped and sized, core and stress members with an overall expansion coefficient greater than silica. This coefficient varies for each make and type of fiber available.

As materials are complex in behavior as a function of temperature, undergoing inversions and crystalline structure changes, there are variations in the coefficient of expansion with temperature both as gradual changes and discontinuous changes. The fiber itself is subject to stress changes internally as a function of temperature and to match substrates and fiber structure would appear to be limited over a large dynamic range of temperature. The invention disclosed herein has a prime advantage that allows for stress relief in the substrates supporting the fiber by design of shape that does not interfere with the method of manufacture and allows the continued use of a common glass type such as Pyrex (trade mark).

Although the invention discloses a preferred embodiment, it is to be understood that it is not so restricted.

What I claim is:

1. An improved optical contact coupler which comprises two optically contacted optical fibers in a substrate, wherein the externally induced stress on the fibers in the region of optical contact is reduced by selecting a substrate material which has a defined coefficient of expansion and wherein the thermal expansion coefficient is near as possible to the mean of the optically contacted fiber assembly in the centre of the coupler.

2. An improved optical contact coupler which comprises two optically contacted optical fibers in a substrate, wherein the externally induced stress on the fibers in the region of optical contact is reduced and wherein said optical fibers are made of a cladding, a core and one or more stress members.

3. An improved optical coupler as claimed in claim 2 wherein said substrate is made of a material softer than said cladding.

4. An improved optical contact coupler which comprises a shaped substrate, and a pair of optically contacted optical fibers, said substrate shaped to flex and absorb stresses caused by the differences in the expansion coefficients of the substrate and the optical fibers.

5. An improved optical contact coupler as claimed in claim 4 wherein said optical fibers are made of a cladding, a core and one or more stress members.

6. An improved optical contact coupler as claimed in claim 4 wherein said fiber is a single mode low birefringence fiber having a low sensitivity to polarization.

7. A coupler as claimed in claim 4 wherein said substrate is a rectangular block, with a longitudinal slot in the top surface and a corresponding longitudinal slot in the bottom surface, wherein the thickness of the substrate between the slots reduces from a maximum value at each end of said slots to a minimum value at the point of optical contact between said fibers.

8. A coupler as claimed in claim 7 wherein said substrate is composed of glass.

9. A coupler as claimed in claim 4 wherein each fiber has a flat, polished surface which is optically contacted to the flat, polished surface of the other fiber.

10. A coupler as claimed in claim 4 wherein the shape of the substrate is selected to reduce the externally induced stress on the fibers in the region of optical contact of the fibers such that a range of substrate materials may be selected which have different expansion coefficients from the fiber.

11. An improved optical coupler as claimed in claim 10 which comprises a pair of shaped substrates, each substrate having a deep and wide slot in the back face of each substrate, the depth of each slot increasing towards the middle of said coupler such that the area of optical coupling has a reduced thickness and a weakened structure, a pair of optically contacted optical fibers, the portion of each fiber in optical contact having been flatten and polished, said pair of substrates being secured together along their edges.

12. A coupler as claimed in claim 11 wherein said substrates are secured together by epoxy resin.

13. A coupler as claimed in claim 10 wherein the substrate is made of a material which has a coefficient of expansion as near as possible to that of the optical fiber.

14. A coupler as claimed in claim 10 wherein said substrate is made of glass.

* * * * *